United States Patent [19]

Wooten et al.

[11] 4,428,170
[45] Jan. 31, 1984

[54] COMBINATION FRAME STRUCTURE AND FASTENING DEVICE FOR VEHICLE SUNROOFS

[75] Inventors: Ronald E. Wooten, Sunnymead; Gerald A. Kwan, Pasadena, both of Calif.

[73] Assignee: Le Van Specialty Co., Inc., City of Industry, Calif.

[21] Appl. No.: 308,392

[22] Filed: Oct. 5, 1981

[51] Int. Cl.$^3$ ............................................. E06B 1/04
[52] U.S. Cl. ..................................... 52/217; 296/218
[58] Field of Search ................ 52/213, 217, 214, 732, 52/767, 768; 296/216, 218, 219

[56] References Cited

U.S. PATENT DOCUMENTS 4,161,336 7/1979 LeVan et al. ...................... 296/218
4,186,525 2/1980 Carvalho ......................... 296/218 X
4,257,632 3/1981 DeStepheno ................... 296/218 X
4,296,961 10/1981 Hunt et al. ...................... 296/218 X Primary Examiner—Carl D. Friedman
Attorney, Agent, or Firm—Francis X. LoJacono

[57] ABSTRACT

A frame structure for vehicle-type sunroofs and like window panels, in combination with a fastening device, wherein the frame structure includes an inner disposed peripheral seal to be engaged by a typical hinged panel. The frame structure defines a peripheral jamb secured in an opening formed in the roof panel of a vehicle, the jamb having a compression-cantilevered clamping bar, the clamping bar being arranged and secured to the frame structure in such a manner as to be positioned between the vehicle roof panel and the interior headliner, whereby neither the frame nor the clamping bar is exposed within the vehicle.

12 Claims, 5 Drawing Figures

COMBINATION FRAME STRUCTURE AND FASTENING DEVICE FOR VEHICLE SUNROOFS

BACKGROUND OF THE INVENTION

1. Field of the Invention

This invention relates generally to sunroofs for vehicles, and more particularly to a sunroof frame structure in combination with a unique concept of securing the structure within the opening in the roof of the vehicle.

2. Description of the Prior Art

Various problems and difficulties are well known in the art of sunroof devices. Some of these problems relate to the fastening and/or securing of a sunroof structure in the opening of the vehicle roof panel. Others relate to the exposure of unsightly frame structures and related fastening means which detract from the overall appearance of the vehicle, particularly the interior of a vehicle.

Many sunroof units presently available have inherent problems such as difficulty of installation and leakage. Most of the available units are further designed to be aftermarket products; and little thought has been given to visually concealing the exposed screws or working parts, in order to provide a sunroof having a custom automotive finish where all pieces are covered, when possible.

An example of a sunroof device and related fastening means is disclosed in U.S. Pat. No. 3,913,971 to Green. This is a detachable sunroof panel for automobiles which includes a fastening means comprising a series of short wedge blocks adapted to be secured to the tapered sections formed on the frame member. These wedge blocks are drawn into the tapered sections, locking the frame to the roof by means of self-tapping screws inserted in holes formed in the wall of the frame. This arrangement presents the problem of uneven clamping action between the series of short wedge blocks, as well as leakage occurring at the holes formed in the frame member. However, this is one of the few designs which allows the fastening wedge blocks to be hidden from view.

U.S. Pat. No. 3,974,753 to Blomgren illustrates the most commonly used assembly configuration at this time. The securing ring is completely exposed about the inner peripheral frame structure, and requires the fastening screws to be exposed. Thus, not only are the screws and the securing ring visible, but a good portion of the frame structure as well. When the screws and the securing ring are employed in this manner, they cannot be hidden from view and must be formed as an expensive finished component of the unit. This is also the case with the device of U.S. Pat. No. 4,161,336 to LeVan, et at, wherein the securing ring and screws are exposed within the vehicle.

Even though all of the above-mentioned sunroof units have become commercially successful, there is a tremendous demand for an aftermarket unit which can be installed to have a custom factory-installed appearance.

SUMMARY OF THE INVENTION

The present invention as herein disclosed establishes a new concept in vehicle sunroof designs, an important object of which is to provide a frame structure and associated members with minimal exposure within the interior of a vehicle, and to further provide an unique fastening device which can be completely hidden from view.

Another object of the invention is to provide a sunroof having a fastening means which incorporates a securing bar or ring that is pivotally arranged to compress in an arcuate manner by providing a linearly disposed fastening screw adapted to be threaded within a continuous longitudinal mounting track formed in the lower portion of the securing bar.

Still another object of the invention is to provide a sunroof structure which includes a securing bar that is pivotally cantilevered along a longitudinal shoulder formed along the lower portion of the frame structure so that, as the securing bar is tightened by a plurality of space screws, the securing force is equally applied along the full length of the abutting engagement of the upper end of the securing bar and the roof panel of the vehicle, thus securely clamping the frame structure to the roof panel with equal force about the entire peripheral edge of the roof opening.

It is another object of the invention to provide a sunroof of this character which includes a frame structure having a design wherein no metal frame or ring surfaces are exposed on the interior of the vehicle, yet it is so designed that it can be installed with very little labor.

Still another object of the invention is to provide a sunroof with such structural characteristics that it is relatively simple and rugged in construction, yet it is inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
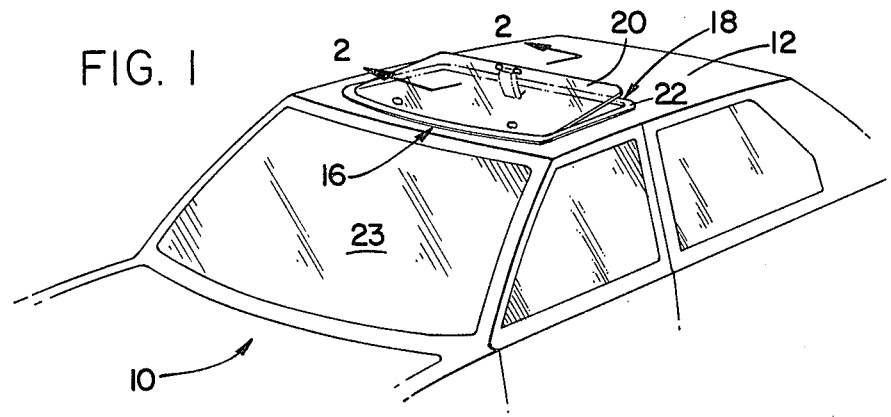
FIG. 1 is a pictorial view of the sunroof installed in the roof of a vehicle in a typical fashion, with a hinged glass panel shown in an open mode.

Referring more particularly to FIG. 1, there is shown a vehicle, generally indicated at 10, having a roof 12 in which an opening 14 is cut. (See FIG. 2.) The vehicle represents any suitable motor vehicle (i.e., car, truck, van, etc.) wherein the present invention is readily capable of being installed. The sunroof installation is generally over the front seat or seats of the vehicle—that is, over the driver's seat and the adjacent passenger's seat.

The present sunroof, designated at 16 and illustrated in FIG. 1, is mounted within opening 14 of roof 12, and has a single continuous peripheral frame structure, indicated at 18, comprising a hinged glass panel 20 which is provided with suitable hinges and a latch, not shown.

Referring more specifically to the construction of the sunroof 16, frame structure 18 is formed having a substantially rectangular, preformed, extruded aluminum molding. Thus, the frame structure is adapted to be inserted into roof aperture or opening 14, wherein a peripheral flange member 22 of the frame structure 18 is supported by roof 12. Thus, opening 14 and frame 18 preferably extend laterally over a substantial width of roof 12, and are most preferably disposed just behind or adjacent the windshield 23.

Frame structure 18, shown in its cross-sectional configuration, comprises a main vertical jamb wall 24 formed at its upper end by the substantially horizontal flange member 22, the flange being provided with a longitudinal peripheral groove 26 to receive a suitable bonding agent 28 therein, so as to prevent leakage into opening 14.

Frame structure 18 is further formed with at least two contiguously positioned channels facing inwardly of the access opening defined by the frame structure. The first channel 29 is formed having a somewhat "L"-shaped configuration defined by an inwardly extended portion of the flange 22, the upper half of jamb wall 24, and a laterally extending intermediate wall 30. This channel is arranged to be coextensive about the frame molding so as to accommodate a continuous, resilient, collapsible rubber gasket 32 which defines a sealing means between panel 20 and frame 18. Accordingly, channel 29 is provided with suitable means for securing gasket 32 in place. The securing means comprises a pair of oppositely disposed hook flanges 34 which are formed along the peripheral inner edge of flange member 22 and intermediate wall 30. The hook flanges are adapted to be received in cooperating longitudinal grooves 35 formed in the sealing gasket 32.

The second contiguous coextensive channel 36 is defined by the lower portion of jamb wall 24, the intermediate wall 30, and a bottom wall 38 which extends inwardly and parallel to the intermediate wall 30. The lower free edge of wall 30 includes a longitudinal lip member 40, an opposing lip member 42 being formed on the free edge of bottom wall 38.

Figure 3:
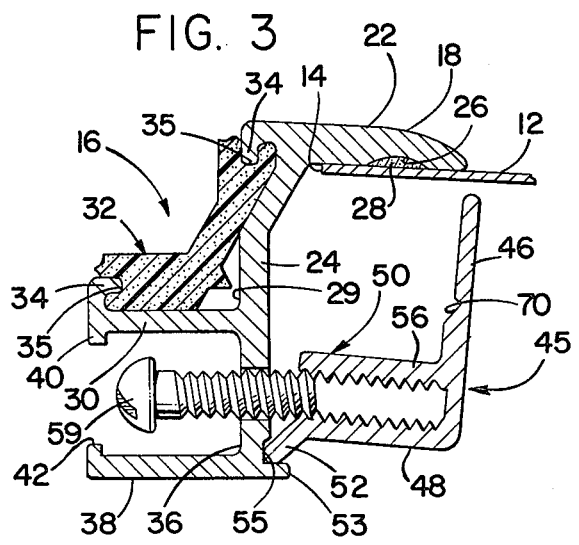
FIG. 3 is a cross-sectional view similar to FIG. 2, but showing the clamping bar in the position prior to being screwed in the secured position of FIG. 2.

When installing the sunroof in a vehicle roof, the above-described frame structure together with sealing gasket 36 are inserted in opening 14, whereby outer flange member 22 is supported on roof 12, as seen in FIG. 3. At this time, the frame member is secured in opening 14 by means of a clamping ring or a plurality of clamping-bar members, generally indicated at 45, which are positioned along the four sides of the structure. Thus, the term "clamping bar" will be used to also describe the clamping ring, since the cross-sectional configuration as seen in the various views will be the same, whether the securing means is in a continuous-ring form or adapted as four separate straight members.

Figure 2:
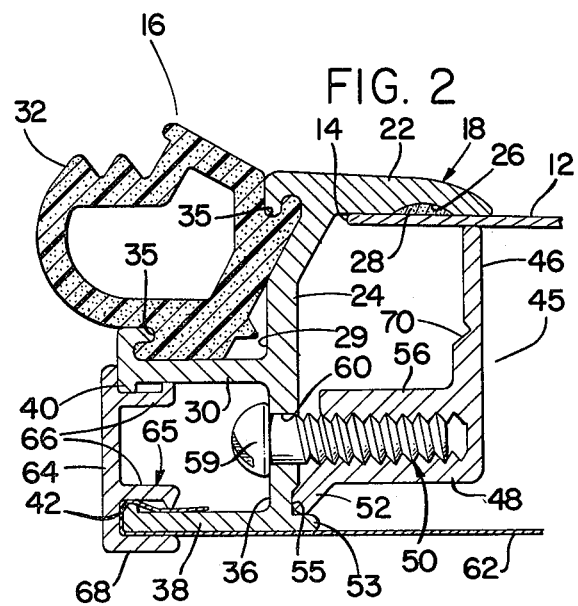
FIG. 2 is an enlarged cross-sectional view taken substantially along line 2—2 of FIG. 1, showing the frame structure in a fully secured arrangement.

The clamping bar comprises an extrusion molded metal bar having a generally "L"-shaped cross-sectional configuration, the vertical wall 46 defining a truss member and the lower horizontal wall 48 thereof defining part of the clamping-bar securing means, which is generally indicated at 50. Integrally formed along the free edge of lower wall 48 is a strut member 52 angularly arranged to engage the outwardly extended shoulder 53 formed on the base of jamb wall 24. Shoulder 53 is formed longitudinally throughout the length of frame 22, including an adjacent slot 55 to receive the rounded free edge of strut 52 therein, whereby slot 55 and strut 52 combine to establish a pivot means, so as to allow bar 45 to pivot into a positive clamping mode as seen in FIG. 2.

Figure 5:
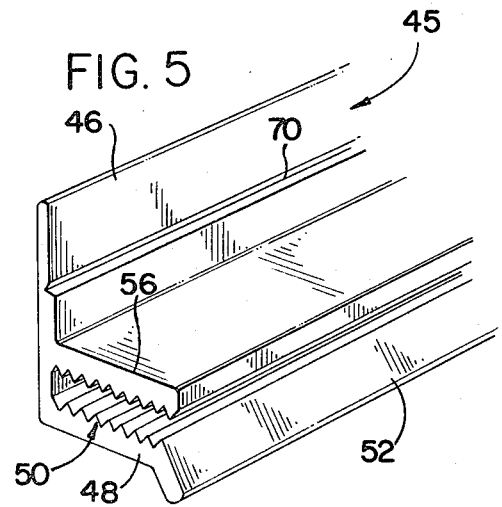
FIG. 5 is a partial perspective view of the clamping bar member.

More specifically, the clamping-bar securing means comprises the lower wall 48 and a second juxtaposed wall member 56 which together form a securing track, the inner opposite surfaces being provided with continuous longitudinal teeth 58, better seen in FIG. 5. Thus, after frame 18 is positioned in opening 14, clamping bar 45 is positioned with strut 52 in groove 55. Suitable bolts or metal screws 59 are inserted through the plurality of spaced-apart holes 60 formed in jamb wall 24 and centrally positioned within the second channel 36. The screws are then threaded into the securing track defined by adjacent wall members 48 and 56.

Due to the arrangement of the longitudinal teeth on the securing track, alignment between screws 59 and bar 45 is not critical. However, various securing means can be employed, but they would not provide for simple and quick installation of the frame structure.

As the screws are tightened within the track, the outwardly cantilevered clamping bar is pulled inwardly about the pivot point at 55, causing truss member 46 to forceably engage the underside of roof 12, thereby clamping roof 12 against flange member 22 of the frame structure. The horizontal arrangement and positioning of screw 59 with respect to the clamping bar 45 is novel in the art, in that it allows for complete concealment of the screws and clamping bar.

Further, the framework is readily designed to be hidden from view. This is accomplished by extending the vehicle headliner 62 so as to cover bottom wall 38 and by providing a cover ring 64 having a keeper means 65, whereby cover ring 64 is removably mounted to cover the second channel 36 and secure headliner 62 in place, as seen in FIG. 2. Cover ring 64 includes a pair of snap arms 66 which are readily snapped into channel 36, the lower arm member cooperating with outer flange member 68 to secure liner 62 in position.

It is contemplated that cover ring 64 can be composed from any suitable material, but preferably a plastic designed to complement the interior of the vehicle—in order to provide a factory-finished appearance, which is highly desirable.

Figure 4:
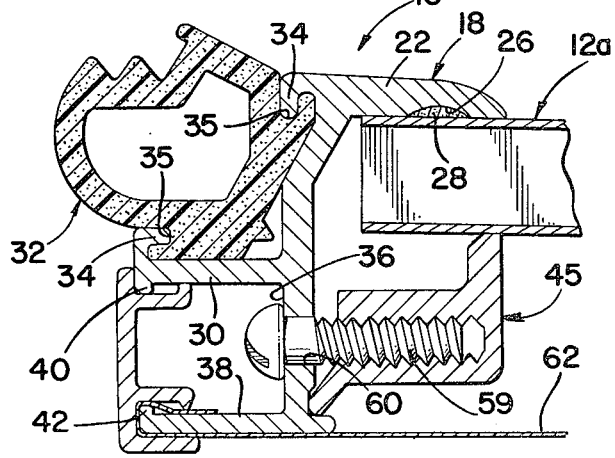
FIG. 4 is a cross-sectional view similar to FIG. 2, wherein the clamping bar is shortened to accept a thicker roof panel between the bar and the outer frame-structure flange.

It is further contemplated that wall 46 can be provided with a longitudinal groove 70 which is located at a given point thereon, so that it can be readily removed to accommodate vehicles having a double-structural roof such as 12a in FIG. 4. The upper portion of wall 46 can be removed with a pair of pliers, or like tool.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and we do not wish to be restricted to the specific form shown or uses mentioned, except as defined in the accompanying claims.

We claim:

1. In combination, a frame structure and fastening device for sunroofs to be mounted in an opening formed in a vehicle roof, wherein the combination comprises:
   a substantially rectangular frame structure defining an access opening, said frame structure being formed having a vertical jamb wall, a peripherally disposed support-flange member integrally formed at the upper end of said jamb wall to engage said vehicle roof;
   a first channel member coextensively formed in said frame structure adapted to receive a sealing member therein, and positioned inwardly of said access opening thereof; and
   a second channel member formed contiguously with said first channel member;
   said first channel member being defined by the upper portion of said jamb wall having an inwardly extending edge member and a laterally extending intermediate wall member, and means formed in said edge member and said intermediate wall member to secure said sealing member in said first channel member;
   said second channel member being defined by the lower portion of said jamb wall having an inwardly extending bottom wall;
   a cantilevered clamping bar adapted to be secured to said frame structure;
   wherein said clamping bar comprises:
   a vertical wall defining a truss member,
   a lower horizontal wall member integrally formed with said vertical wall, to establish the substantially "L"-shaped, cross-sectional configuration of said clamping bar,
   pivot means formed on said clamping bar for pivotal engagement with said frame structure,
   said pivot means comprising a pivotal strut member formed longitudinally along one edge of said clamping bar, and positioned to pivotally engage said frame structure, and
   means on said clamping bar for fastening said clamping bar to said frame structure to cause said clamping bar to pivot to a clamping position against said vehicle roof, whereby said vehicle roof is fixedly secured between said support flange and said clamping bar,
   said means for fastening said clamping bar to said frame structure comprising a securing track formed in said lower horizontal wall of said clamping-bar member.

2. The combination as recited in claim 1, wherein said securing track is defined by said lower horizontal wall and a second juxtaposed wall member, each of said opposing walls including a plurality of continuous longitudinal teeth.

3. The combination as recited in claim 2, wherein said means to secure said sealing member within said first channel comprises a hook flange formed along said inwardly extended edge member of said first channel member and on the leading edge of said intermediate wall member thereof.

4. The combination as recited in claim 3, including a sealing member having a pair of longitudinal grooves adapted to receive respective hook flanges therein.

5. The combination as recited in claim 2, wherein said frame structure includes a plurality of clamping-bar members.

6. The combination as recited in claim 2, wherein said clamping-bar member is formed as a continuous ring member adapted to be secured about said frame structure as an individual member.

7. The combination as recited in claim 2, wherein said second channel member includes a plurality of holes disposed in said jamb wall, to receive screws therethrough for alignment and engagement with said securing track.

8. The combination as recited in claim 7, wherein said pivotal strut member is angularly disposed along the leading edge of said lower horizontal wall of said securing track, and wherein said frame structure includes a continuous longitudinal groove positioned adjacent the lower outer edge of said jamb wall and adapted to pivotally receive said strut member for rotational movement therein.

9. In combination, a frame structure and fastening device for sunroofs to be mounted in an opening formed in a vehicle roof, wherein the combination comprises:
   a substantially rectangular frame structure defining an access opening, said frame structure being formed having a vertical jamb wall, a peripherally disposed support-flange member integrally formed at the upper end of said jamb wall to engage said vehicle roof;
   a first channel member coextensively formed in said frame structure adapted to receive a sealing member therein, and positioned inwardly of said access opening thereof; and
   a second channel member formed contiguously with said first channel member;
   said first channel member being defined by the upper portion of said jamb wall having an inwardly extended edge member and a laterally extending intermediate wall member, and means formed in said edge member and said intermediate wall member to secure said sealing member in said first channel member;
   said second channel member being defined by the lower portion of said jamb wall having an inwardly extended bottom wall; and
   a continuous cover member adapted to be mounted in said second channel.

10. A clamping bar adapted to secure a frame member to a fixed structure, said clamping bar comprising:
    a vertical wall defining a truss member;
    a lower horizontal wall member integrally formed with said vertical wall and extending outwardly to one side of said vertical wall, to substantially define an "L"-shaped cross-sectional configuration;
    a securing track formed longitudinally along said lower horizontal wall member and adapted to receive screws therein;
    said securing track comprising said lower horizontal wall member and a second juxtaposed wall member, each of said wall members including a plurality of continuous longitudinal teeth formed in the opposing surfaces of said wall members; and
    pivot means positioned on said clamping bar to pivotally engage said frame member, whereby said clamping bar is allowed to forceably engage said fixed structure, thereby clamping said frame member between said truss member and said fixed structure.

11. A clamping bar as recited in claim 10, wherein said pivot means comprises a longitudinal angularly disposed strut member formed along the leading edge of said lower wall member.

12. A clamping bar as recited in claim 11, wherein said vertical wall includes a longitudinal groove formed intermediate the ends thereof defining an upper and a lower half, whereby said upper half can be removed from said lower half along said groove.

* * * * *